US00RE41487E

(19) United States
(12) Reissued Patent
Liu et al.

(10) Patent Number: US RE41,487 E
(45) Date of Reissued Patent: *Aug. 10, 2010

(54) APPARATUS, METHODS AND SYSTEMS FOR ANONYMOUS COMMUNICATION

(75) Inventors: Christina Ying Liu, Freemont, CA (US); William Ho Chang, Vancouver, WA (US)

(73) Assignee: Flexiworld Technologies, Inc., Portland, OR (US)

( * ) Notice: This patent is subject to a terminal disclaimer.

(21) Appl. No.: 12/200,014

(22) Filed: Aug. 28, 2008

Related U.S. Patent Documents

Reissue of:
(64) Patent No.: 7,099,304
Issued: Aug. 29, 2006
Appl. No.: 09/947,116
Filed: Sep. 4, 2001

U.S. Applications:
(60) Provisional application No. 60/230,021, filed on Sep. 5, 2000, now Pat. No. 7,099,304.

(51) Int. Cl.
*H04L 12/66* (2006.01)

(52) U.S. Cl. ..... 370/352; 379/201.1
(58) Field of Classification Search ..... None
See application file for complete search history.

(56) References Cited

U.S. PATENT DOCUMENTS 3,648,254 A * 3/1972 Beausoleil ..... 365/49.17
3,883,693 A * 5/1975 Moore ..... 370/452
3,909,562 A * 9/1975 Lager ..... 370/250
4,757,267 A 7/1988 Riskin
4,847,890 A 7/1989 Solomon et al.
4,878,239 A 10/1989 Solomon et al.
4,899,373 A 2/1990 Lee et al.
5,058,152 A 10/1991 Solomon et al.

(Continued)

OTHER PUBLICATIONS

Kristin L. Cleveland of Klarquist Sparkman, LLP, "Skype's Objections and Responses to Plaintiff's 1st Set of Interrogatories, " May 5, 2008, 18 pages.
CTI for Management Buyer's Guide, "Internet Phone Release 4 VocalTec Ltd," 1996/1997, pp. 28 through 32.
VocalTec, Ltd, "VocalTec Internet Phone README: Release 4 Window 95," dated Jun. 7, 1996, three sheets.
VocalTec, Ltd, "VocalTec Internet Phone Release 4 Help topics," Copyright 1993–1996 VocalTec, Ltd., 77 sheets.
VocalTec, Ltd. Screen Images from Internet Phone Release 4 software, Copyright 1993–1996 VocalTec Ltd., 19 sheets.

(Continued)

*Primary Examiner*—Robert W Wilson
(74) *Attorney, Agent, or Firm*—Kolisch Hartwell, PC

(57) ABSTRACT

Anonymous voice communication between a first station and a second station is facilitated by providing an interface that allows input of a transaction specification from at least one of the first and second stations. A reference code associated with the transaction is generated, there being a defined relationship between the reference code and the address of the second station for voice communication. The reference code is supplied to the first station, and a voice communication request and the reference code are received from the first station. The reference code is used to recover said address and a channel for voice communication is opened between said first and second stations. Voice communication can thereby be established between the first and second stations without providing the address of the second station to the first station.

23 Claims, 6 Drawing Sheets

U.S. PATENT DOCUMENTS 5,247,571 A 9/1993 Kay et al.
5,353,331 A 10/1994 Emery et al.
5,361,295 A 11/1994 Solomon et al.
5,559,868 A 9/1996 Blonder
5,751,968 A 5/1998 Cohen
5,754,636 A 5/1998 Bayless et al.
5,754,938 A 5/1998 Herz et al.
5,757,267 A 5/1998 Xydis
5,761,279 A 6/1998 Bierman et al.
5,797,099 A 8/1998 Ejzak et al.
5,805,677 A 9/1998 Ferry et al.
5,809,114 A * 9/1998 Solomon et al. ..... 379/88.19
5,818,836 A * 10/1998 DuVal ..... 370/389
5,825,771 A 10/1998 Cohen et al.
5,845,266 A 12/1998 Lupien et al.
5,864,612 A 1/1999 Strauss et al.
5,907,604 A 5/1999 Hsu
5,907,677 A 5/1999 Glenn et al.
5,910,946 A 6/1999 Csapo
5,956,020 A 9/1999 D'Amico et al.
6,011,794 A 1/2000 Mordowitz et al.
6,038,433 A 3/2000 Vegt
6,067,347 A 5/2000 Farris et al.
6,069,890 A 5/2000 White et al.
6,072,780 A 6/2000 Johnson, Jr. et al.
6,148,067 A 11/2000 Leipow
6,175,619 B1 * 1/2001 DeSimone ..... 379/202.01
6,243,398 B1 6/2001 Kahane et al.
6,259,538 B1 7/2001 Amit et al.
6,332,153 B1 12/2001 Cohen
6,353,660 B1 * 3/2002 Burger et al. ..... 379/88.17
6,445,681 B1 9/2002 Pogrebinsky
6,519,541 B1 2/2003 Bitton
6,594,254 B1 7/2003 Kelly
6,661,793 B1 12/2003 Pogrebinsky
6,665,389 B1 * 12/2003 Haste, III ..... 379/196
6,678,663 B1 1/2004 Mayo
6,694,003 B1 * 2/2004 Karam ..... 379/211.02
6,711,158 B1 3/2004 Kahane et al.
6,714,519 B2 3/2004 Luzzati et al.
6,725,191 B2 4/2004 Mecayten
6,754,181 B1 5/2004 Elliott et al.
6,785,301 B1 8/2004 Chapman et al.
6,801,952 B2 * 10/2004 Belzile ..... 709/249
6,876,734 B1 4/2005 Summers et al.
7,039,040 B1 5/2006 Burg
7,142,506 B1 11/2006 Pogrebinsky
2002/0004900 A1 1/2002 Patel
2005/0122965 A1 6/2005 Heinla et al.

OTHER PUBLICATIONS

Hoshi et al, "Voice Stream Multiplexing between IP telephony Gateways," IEICE Trans. Inf. & Sys, vol. E82–D No. 4, Apr. 4, 1999, pp. 838 through 845.
Annabel Z. Dodd, "The Essential Guide to telecommunications," 1999, Chapters 8–10, Prentiss–Hall, 62 pages.
Production documents, numbered FLE000103–FLE000114 relating to webpages from www.exp.com, Aug. 6, 2000, 12 pages.
Production documents, numbered FLE–000087–FLE000102 relating to web pages from www.keen.com, Aug. 6, 2000, 16 pages.
Office action regarding U.S. Appl. No. 12/199,647, Mar. 13, 2009, 29 pages, U.S. Patent and Trademark Office.
Office action regarding U.S. Appl. No. 12/199,631, Mar. 13, 2009, 24 pages, U.S. Patent and Trademark Office.
Office action regarding U.S. Appl. No. 12/199,711, Apr. 8, 2009, 16 pages, U.S. Patent and Trademark Office.
Office action regarding U.S. Appl. No. 12/200,014, Mar. 13, 2009, 17 pages, U.S. PAtent and Trademark Office.
Office action regarding U.S. Appl. No. 12/200,148, Mar. 13, 2009, 27 pages, U.S. Patent and Trademark Office.
Office action regarding U.S. Appl. No. 12/200,305, Mar. 13, 2009, 15 pages, U.S. Patent and Trademark Office.
Office action regarding U.S. Appl. No. 12/200,645, Mar. 13, 2009, 16 pages, U.S. Patent and Trademark Office.
Michael N. Zachary of Klarquist Sparkman, LLP and Peter E. Heuser of Kolisch Hartwell, P.C., "Stipulation and Order of Dismissal with Prejudice," Apr. 21, 2009, 4 pages.
Hoshi et. al., Voice Stream Multiplexing between IP telephony Gateways, IEICE TRANS Dated Apr. 4, 1999.*

* cited by examiner

APPARATUS, METHODS AND SYSTEMS FOR ANONYMOUS COMMUNICATION

Matter enclosed in heavy brackets [ ] appears in the original patent but forms no part of this reissue specification; matter printed in italics indicates the additions made by reissue.

CROSS-REFERENCE TO RELATED APPLICATION

*This reissue application is related to the following reissue applications of U.S. Pat. No. 7,099,304 granted on Aug. 29, 2006; Ser. No. 12/199,647 filed on Aug. 27, 2008; Ser. No. 12/199,631 filed on Aug. 27, 2008; Ser. No. 12/199,711 filed on Aug. 27, 2008; Ser. No. 12/200,148 filed on Aug. 28, 2008; Ser. No. 12/200,305 filed on Aug. 28, 2008; and Ser. No. 12/200,645 filed on Aug. 28, 2008.*

This application claims benefit of Provisional Application No. 60/230,021 filed Sep. 5, 2000, the entire disclosure of which is hereby incorporated by reference herein for all purposes.

BACKGROUND OF THE INVENTION

The Internet is a collection of computer networks from which users obtain and share information. The Internet has evolved from the ARPAnet to become the largest computer network in the world. The Internet supports various services. Of these services, the World Wide Web (the "Web") and email are among the most widely used. Of these, the Web comprises a collection of hundreds of millions of documents ("Web pages") written in mark up languages such as HTML, XML, and WML.

In Internet transmissions, Transaction Control Protocol/Internet Protocol ("TCP/IP") is the communication standard. TCP/IP is a suite of protocols enabling communication between each node of the network. With the increasing bandwidth being offered by network carriers, not only data but also voice, audio and video are increasingly being transmitted through the network.

The evolution of the Internet continues and, in so doing, drives Internet-related product development, including in hardware, software and protocols. The Internet is extending in wireless communication and handheld devices. As an example, Internet-enabled cellular phones (such as smart and super phones) combine the features of cellular phones with the ability to access the Internet. As another example, certain personal digital assistants ("PDAs") are directed to couple standard features with wireless access to the Internet. These phones, PDAs and other handheld devices exploit protocols such as, but not limited to, WAP, Web clipping, HDML or CHTML. Through these Internet-enabled devices, it is anticipated that users will not only place phone calls, organize their schedules and/or otherwise exploit the respective device's standard functionality, but also access the Internet for browsing the Web, obtaining information, communicating (e.g., via email) and the like. In so doing, it is also anticipated that the device's standard features and the Internet's benefits will both be enhanced.

The evolution of the Internet also implicates an evolution, if not revolution, in the infrastructure of communication networks. Today, people generally obtain personal access to the Internet by dialing up Internet service providers; the dial up may be carried for example over circuit-switched networks ("CSN"), typically via local telecommunications providers. In dial up, CSNs establish a physical circuit, which is dedicated exclusively to the call between the parties.

While generally available to users, CSNs appear to be in relative decline, being increasingly supplanted by packet-switched technologies. Packet-switched technologies significantly increase a network's speed and capacity. In packet-switched networks, traffic is digitized, compressed, and transported as packets. These networks enable the packets of a particular transmission to travel through various channels from source to destination. Moreover, these networks enable traffic in varied media types, including voice, audio, video, text, data and facsimile. In enabling the varied types, moreover, the networks may deploy technologies (e.g., ATM), which enable significant features, such as quality of service, wherein priorities are assigned to and among the media types (e.g., so that packets of voice communications arrive timely, thereby ensuring adequate fidelity for the conversation).

Packet-switched networks follow open standards. Accordingly, these networks enhance the ability of service providers to deploy new services, including high-bandwidth services for Internet use or otherwise (e.g., television programming and/or video on demand). By comparison, in circuit-switched networks, the call control functionality and the service logic tend to be buried within the switch. Moreover, the functionality generally is proprietary to the switch vendors. As such, new services generally are deployed at the discretion of the switch vendor, not the service providers.

In addition to hardware, software, protocols and infrastructure, the evolution of the Internet also implicates development of new and improved services. Already, marketplaces on the Internet (i.e., virtual marketplaces) are well known and increasingly diverse in direction, content and business model. Ebay, Yahoo, E*Trade and Amazon are examples, each facilitating transactions, including the selling, buying and auctioning of merchandise and the provision of services, with and among enterprises and individuals. The merchandise and services comprise a wide variety, from books to automobiles, to stocks, to calendaring, that seems ever expanding in breadth.

Overcoming the geographic constraints of physical proximity, the Internet also introduces increasing and new opportunities for people to meet and interact with each other. Communities on the Internet (i.e., virtual communities) are well known and increasingly diverse in style, content and target participants. Virtual communities typically offer services and associated tools, such as chat rooms, email and Web publishing. Through these services and tools, virtual communities enable their participants to communicate, including to express their respective views, share common interest(s) and otherwise interact as if in the physical world, and increasingly in ways not available in the physical world.

Virtual marketplaces may facilitate the exchange or trading of ideas, knowledge and information between and among individuals and entities (sometimes referred to collectively herein as "participants"). These virtual marketplaces ("information marketplaces") tend to have an express or implied premise, understanding or foundation: individuals and entities have one or more interests and/or areas of expertise that can or should be (a) shared with or provided to participants, (b) nurtured/advanced by interaction with participants, and/or (c) otherwise communicated to or with other participants for some derived benefit of either or both participants.

In an example of a transaction in a contemplated information marketplace, a participant (the "initiator") posts a question, inquiry or view ("posting") at a selected Web site of the marketplace. The initiator has the goal of obtaining one or more of answers, information, direction, responses or interaction ("response") from or with one or more participants. The initiator may choose to direct the posting to selected participants ("experts"). The initiator preferably is enabled to select experts based on the experts' identified or claimed interest/expertise. The initiator may have identified interests and expertise. Indeed, the initiator may also be an expert in the marketplace and, conversely, the expert may also be an initiator in the marketplace.

A contemplated information marketplace preferably supports provision of the qualifications or characteristics of its experts, initiators and/or participants and may do so variously. In an example case, the marketplace publishes qualifications/characteristics (e.g., on Web sites or page(s)). The qualifications/characteristics may be mandated or voluntary, or a combination. The qualifications/characteristics may, particularly in the case of initiators, be selectable by the participant. The qualifications/characteristics may include various data, such as, among others, profile descriptions, transaction history (e.g., in the marketplace), ratings (e.g., marketplace, participant, expert and/or initiator provided), comments and reviews (e.g., marketplace, participant, expert and/or initiator provided), fee schedules or other forms of pricing. Profile descriptions may include, among other things, certifications (e.g., marketplace, professional, or governmental), specialties, sub-area(s) of interest/expertise, education, years of practice, awards, geographic location, and geographic scope or limitation on the interest/expertise. Profile descriptions may also include particularly for initiatorsqualifications or characteristics in the field of the posting, transaction history in the field of the posting, credit rating, age, education level, and geographic location.

Once an initiator selects one or more experts, a next step is to establish a communication link between the initiator and an expert for posting and response (an "information transaction"). A communication link may be variously provided, including via email, online chat and instant messaging. However, a drawback of email is that it relies on text communication (e.g., typing), with its attendant mechanical challenges. Another drawback of email is the time lag ("latency") between sending an email and receiving a response. Yet another drawback of email is that it has a low level of interactivity and, as such, tends to be impersonal, ambiguous and inefficient in communication. Accordingly, email tends to hinder experts in providing a response, particularly one suited to and satisfying of the initiator's needs.

Online chat and instant messaging tend to be more interactive than email. Even so, each also again relies on text communication. Moreover, by their nature, chat and instant messaging tend to introduce an emphasis on speed in that text communication (e.g., fast typing). This emphasis generally is undesirable. Indeed, this emphasis can be a substantial hindrance for people either who are not familiar or adept with keyboards, who are physically excluded from keyboard use and/or whose written language is not based on Roman characters (e.g., those using symbol-based written languages, such as Chinese). Moreover, this emphasis may be specifically undesirable and the hindrance exacerbated in the context of an information instruction (e.g., initiators and/or experts in an information marketplace find the emphasis on rapid typing to be detrimental to an information instruction).

Given these drawbacks, a contemplated information marketplace preferably supplants or supplements email, online chat and instant messaging with other forms of Internet-based or Internet-related communication. Such forms of communication typically rely—at least in part—on voice communication. These forms include audio and/or audio/video conferencing, with or without text communication. These forms are desirable in their enhanced interactivity, reduced latency and de-emphasis on writing, particularly rapid writing. As such, these forms tend to provide more personal, direct, clear and efficient communication. These forms are simply more natural. Accordingly, these forms tend to be particularly desirable for initiators and experts alike in the context of an information marketplace.

Although voice communication tends to be more direct, efficient and otherwise desirable than e-mail, chat, and instant messaging, voice communication also tends to have some drawbacks. In particular, voice communication generally is subject to a lower level of anonymity (whether real or perceived) than is typically associated with each of email, chat and instant messaging.

Anonymity typically characterizes interaction and other communication via the Internet. For example, people are enabled to interact and otherwise communicate in cyber space without revealing much, if any, personal information, such as legal names or phone numbers.

Internet users tend to prefer anonymity for various reasons. As an example, an employee using the Internet to search for a new job desires anonymity so as to preclude any revelation of their identity to a current employer, supervisors and/or colleagues. As another example, an individual who has provided personal financial data to an online planner may desire anonymity so that the data is not associated with the individual's identity (such association potentially transforming the raw data into valuable information). As yet another example, members of Internet communities use various kinds of substitute names (e.g., aliases, nicknames or user names) in communicating with each other.

The shortfall of anonymity in voice communications—particularly conversations conducted via the standard telephone system—tends to introduce problems with privacy, particularly expectations of privacy. A common such problem is the receipt of unwanted phone calls. These unwanted calls can be annoying (e.g., telephone calls from telemarketers), disturbing (e.g., contact from objectionable political organizations) and even frightening (e.g., intrusions from ostensibly dangerous individuals). Perhaps because voice communication is direct, unwanted calls tend to be difficult to terminate. Perhaps because telephone conversations are more personal, people tend not to fully block, automatically reject or otherwise absolutely deal with calls from unknown sources, which calls have a tendency to be unwanted but which could cause desirable or important calls to be missed (e.g., a friend of family member calling for emergency assistance).

Based at least in part on concerns about unwanted calls, people remain reluctant to disclose their phone numbers, particularly their home telephone and personal cellular numbers. This reluctance also tends to reflect, at least in part, the perception that phone numbers enable the recipients to more readily discover personal information about the person that disclosed the number, such as name and physical address. This reluctance also tends to result in slow acceptance and lesser use among Internet users of voice communication (i.e., as compared to email, chat and instant messaging), whether such communication is Internet-based or Internet-related (e.g., via standard telephone service (also known as the plain old telephone system ("POTS")), but initiated by or in connection with Internet services).

It is desirable, then, to integrate voice communication and anonymity. An example of such integration may be illustrated in the context of an information marketplace. There, an initiator determines to conduct an information instruction with a selected expert via voice communication. To do so, the initiator submits a request for voice communication with the selected expert, the submission being through the Internet to the operator or other infrastructure of the information marketplace (or other service or system that supports linking by voice communication). The marketplace contacts the selected expert. The contact may be via (a) the Internet, so as to support voice communication as voice over Internet protocol ("VoIP") or (b) telephone service. In either case, if the contact results in establishing a voice communication link with the expert, the marketplace maintains that link (e.g., puts the expert on hold) while establishing voice connection with the initiator before connecting the expert and the initiator. The marketplace makes that connection, in one case, by linking the initiator and the expert over the Internet, with the marketplace either interposed in the transmission of packets or enabling direct transmission. In another case, the marketplace bridges between the initiator communicating over the Internet (e.g., VoIP) and the expert communicating via standard telephony. In yet another case, the marketplace connects by contacting the initiator by telephone and, once the initiator is on the line, connecting the initiator with the expert who is also linked by telephone. In each and any case, a connection is made and voice communication is enabled, characterized by enhanced support for anonymity.

Integration of anonymity and voice communication in this form tends to have shortfalls. One of the shortfalls is that a party may be contacted, without advance notice and at any time by the marketplace, responsive to any initiator's request. That scope of contact tends to deprive the contacted party of control over their respective schedules, which in turn, tends to degrade productivity and efficiency in their work and to reduce the quality of their personal time. Indeed, without advance notice of calls in an information marketplace, an expert may be induced to keep the telephone proximate at all times, so as to either take calls in interruption of other work or play and/or to forestall work or play in anticipation of calls (e.g., calls that might never arise). This tends to have enhanced relevance in the commercial or professional context, wherein the expert seeks to provide high quality and highly responsive service to clients (e.g., initiators) so as to, among other things, keep clients satisfied and otherwise happy with the provided services (e.g., to avoid unanswered calls).

One solution to this shortfall is to support specified times and/or time range(s) during which a party (e.g., an expert of an information marketplace) is committed to be available for receipt of calls from the information marketplace. In the information marketplace, these times and ranges are office hours. During an expert's office hours, the expert commits, or even guarantees, to be present to receive calls from the marketplace. At the same time, the expert benefits by enhanced knowledge of and personal control over, when such calls, if any, may arise.

This solution, however, also has shortfalls. In the information marketplace, one shortfall is its tendency to reduce, from an already finite number of experts available via the marketplace, the number of experts actually available at any given time. That is, at any given time, it is to be expected that, via the marketplace, less than all of the experts are within their office hours. Moreover, even if a particular expert is within their office hours, a reduced supply of experts will tend to reduce the frequency at which requests result in a connection (e.g., the expert will have an increased chance of being busy with another, earlier initiator).

Another shortfall is that the initiator will generally attempt to contact the expert promptly, if not immediately or substantially immediately, after indicating interest in contact, and this might not be convenient for the expert even if the initiator attempts to make contact within the expert's office hours.

As another example, a service or system supporting integration may assign individuals and entities respective user codes, each of which uniquely identifies the particular user. To support such codes, the service/system stores the codes, e.g., in one or more databases. Preferably, the service/system associates the codes with the telephone number and/or contact information of the respective individuals and entities.

The service/system may use the user codes variously. For example, in a virtual chat room context, the service/system may enable participants to place an advertisement (e.g., in a publication, such as a physical or virtual magazine) carrying the telephone number of the marketplace and citing the user code. In that circumstance, an observer of the advertisement may contact the participant by placing a telephone call to the marketplace and entering the user code. The service/system then establishes the communication link to the participant, e.g., by placing the observer on hold, retrieving the participant's telephone number by association with the user code, contacting the participant and, once the participant is contacted and found to be available, connecting the participant with the calling observer. In this manner, the observer does not know the actual phone number of the participant, thus preserving the participant's anonymity.

This design is suitable for chat rooms where participants talk to each other casually, and the system only needs to identify different participants. However, user code is not sufficient to identify and describe different transactions having different transaction specifications and connection criteria among participants, as in the context of an information marketplace where participants buy and sell information.

As still another example, a service or system supporting integration of anonymity and voice communication may assign each user a contact code, the contact code identifying each user as a party to a scheduled voice communication. The contact code may be one or more groups of alphanumeric characters (e.g., if the contact code comprises a call code and password, it may be provided as one or two numbers). In supporting contact codes, the service/system enables the parties to place separate telephone calls (through the public switched telephone network or via the Internet) to the service/system (or related infrastructure) at a scheduled time. Upon connection with the service/system, each party enters their respective contact codes (e.g., through their telephone keypads). The service/system compares the contact codes entered by the parties and connects the telephone calls if the contact codes arc proper (e.g., the codes must either match exactly or match in accordance with predetermined criteria).

Yet another example is an extension of the contact code feature. In this case, the service/system creates, after the first successful connection between two parties, a record indicative of these two parties and/or of the connection. Based on that record, the service/system may be configured to connect either party to the other when, in the future, one party dials into the system and inputs their contact code. That is, the service/system places a call to the non-calling party, rather than requiring the non-calling party to dial in. In such case the service/system may be configured to support (a) provision of information to the called party about the calling party, e.g., upon the service/system contacting the called party, (b) a request that the called party enter their contact code, (c) a combination of these. The service/system may be configured so that either or both parties may elect in or out of this feature.

In addition to the shortfall of using user code, this method requires participants placing separate phone calls to the service/system at the same time.

SUMMARY OF THE INVENTION

It has now been recognized that the services/systems described above do not allow one or more parties to specify the nature of the transaction, e.g. with respect to time or time interval, billing arrangements, and other variables.

In accordance with a first aspect of the invention there is provided a method of facilitating anonymous voice communication between a first station and a second station, at least the second station having an address for voice communication, the method comprising providing an interface that allows input of a transaction specification from at least one of the first and second stations, generating a reference code associated with the transaction, there being a defined relationship between the reference code and said address, supplying the reference code to at least the first station, receiving a voice communication request from the first station, receiving the reference code from the first station, using the reference code to recover said address, and opening a channel for voice communication between said first and second stations, whereby voice communication can be established between the first and second stations without providing said address to the first station.

In accordance with a second aspect of the invention there is provided a method of establishing anonymous voice communication between a first station and a second station, at least the second station having an address for voice communication, the method comprising supplying a transaction specification from at least one of the first and second stations to a controller, generating a reference code associated with the transaction at the controller, there being a defined relationship between the reference code and said address, supplying the reference code from the controller to at least the first station, making a voice communication request from the first station to the controller, supplying the reference code from the first station to the controller, using the controller to recover said address from the reference code, and opening a channel for voice communication between said first and second stations.

In accordance with a third aspect of the invention there is provided an apparatus for facilitating anonymous voice communication between a first party and a second party, at least the second party having an address for voice communication, including a means for enabling negotiation of a transaction specification, a means for generating a reference code, there being a defined relationship between the reference code and said address, and for supplying the reference code to the first party, a means for receiving a voice communication request from the first party and for receiving the reference code from the first party, a means for using the reference code to recover said address, and a means for opening a voice communication channel between said first party and said address without supplying said address to the first party.

A preferred embodiment of the invention facilitates anonymous voice communication between parties involved in online transactions.

In a preferred embodiment of the invention, either/both parties are able to schedule individually or in coordination one or more future (and/or immediate) appointments for voice communication while preserving anonymity.

A preferred embodiment of the invention allows transacting parties to specify their mutually agreed connection criteria, such as connection time frame, which party should initiate the connection, charging method and duration of the communication. Referring to the example of an expert community, experts are not restricted to their office hours without knowing when, if ever, they will be contacted by the system for servicing a user request. On the other hand, users would be able to have access to all registered experts without having to wait for their office hours because both parties can set up mutually agreed upon appointment time for voice communication.

In various forms of integration of voice communication and anonymity, one or more additional features may be desirable. As an example, a service or system supporting integration may provide a transaction tracking mechanism and/or process that enables identification and cataloging of a user's various transactions. Such mechanism and/or process responds to the fact that a given user may have a history of transactions and, at any given time, may be involved in several transactions, with each such past and current transaction typically having different attributes and connection criteria.

To illustrate by scenario, users A, B and C are participants in an information marketplace. In the marketplace, participant A is an expert in both career planning and fishing. Participant A is counseling participants B and C, individually, as to career planning, with the assistance being provided via anonymous voice communication. Participant A is also advising participant C as to fishing skills, which advice if provided via email. Participant A charges different fees to participant B than to participant C for career planning, based on the differing complexity of the cases. Participant A charges participant C a much lower price for the fishing advice. Moreover, participant A counsels participants B and C during daytime hours, while responding to C on fishing skills only during evening hours. Participant A also places restrictions on the times during which participants B and C are permitted to make contact for career counseling.

In the above scenario, the transaction tracking mechanism/process preferably is implemented so as (a) to differentiate among transactions, even if the transactions are between the same two participants and (b) to track, for each such transaction, the transaction's attributes, such as, but not limited to, fees or other pricing, elapsed time, connection type (e.g., voice, chat, email, etc.), and scheduling.

In a preferred embodiment of the invention, relating to this example, a reference code is associated with each transaction. The use of a transaction specific reference code makes it possible to manage each voice communication event individually according to connection criteria agreed by transacting parties. Assigning a reference code to each transaction provide more manageable flexibility. For example, user A can request to be connected to B and C separately. Since these two transactions have different reference codes, the system would know how to charge B and C differently for the connection. User C is to be connected with at least twice, once for career coaching and once for fishing tips. With different reference codes, the system is able to distinguish which connection is for career coaching and which is for fishing tips, and therefore, charge C accordingly.

A service or system supporting integration preferably offers network flexibility. Preferably the service/system is Internet-based, but also compatible with circuit-switched networks. In addition, the service/system preferably is not restricted to circuit-switched networks for establishment of communication links between parties, particularly for voice communication.

Still further, a preferred embodiment of the invention provides a method and apparatus to guarantee fulfillment of pre-agreed criteria of the transaction specification. For example, in a preferred embodiment of the invention the connection can only be established during a pre-agreed connection time frame. Connection request outside of the pre-agreed time frame may be rejected. This time frame, as an attribute of the transaction specification, is inputted by the user and stored in a database. This information can be retrieved from the database using the reference code. A controller unit qualifies the connection according to the transaction specification, such as the pre-agreed appointment time. The controller unit also monitors the connection and generates logs, which can be used to bill the user based on pre-agreed rate.

A preferred embodiment of the invention provides an automated process for end users to be connected automatically without manual input. The process of obtaining the reference code, connecting to the controller unit and inputting the reference code can be automated by a software program or hardware component in the communication device of the user. Therefore, with a click of a button, the user is anonymously and automatically connected with the other party for voice communication.

BRIEF DESCRIPTION OF THE DRAWINGS

For a better understanding of the invention, and to show how the same may be carried into effect, reference will now be made, by way of example, to the accompanying drawings, in which FIG. 1 provides a conceptualized illustration of the anonymous connection system.

DETAILED DESCRIPTION

Figure 1:
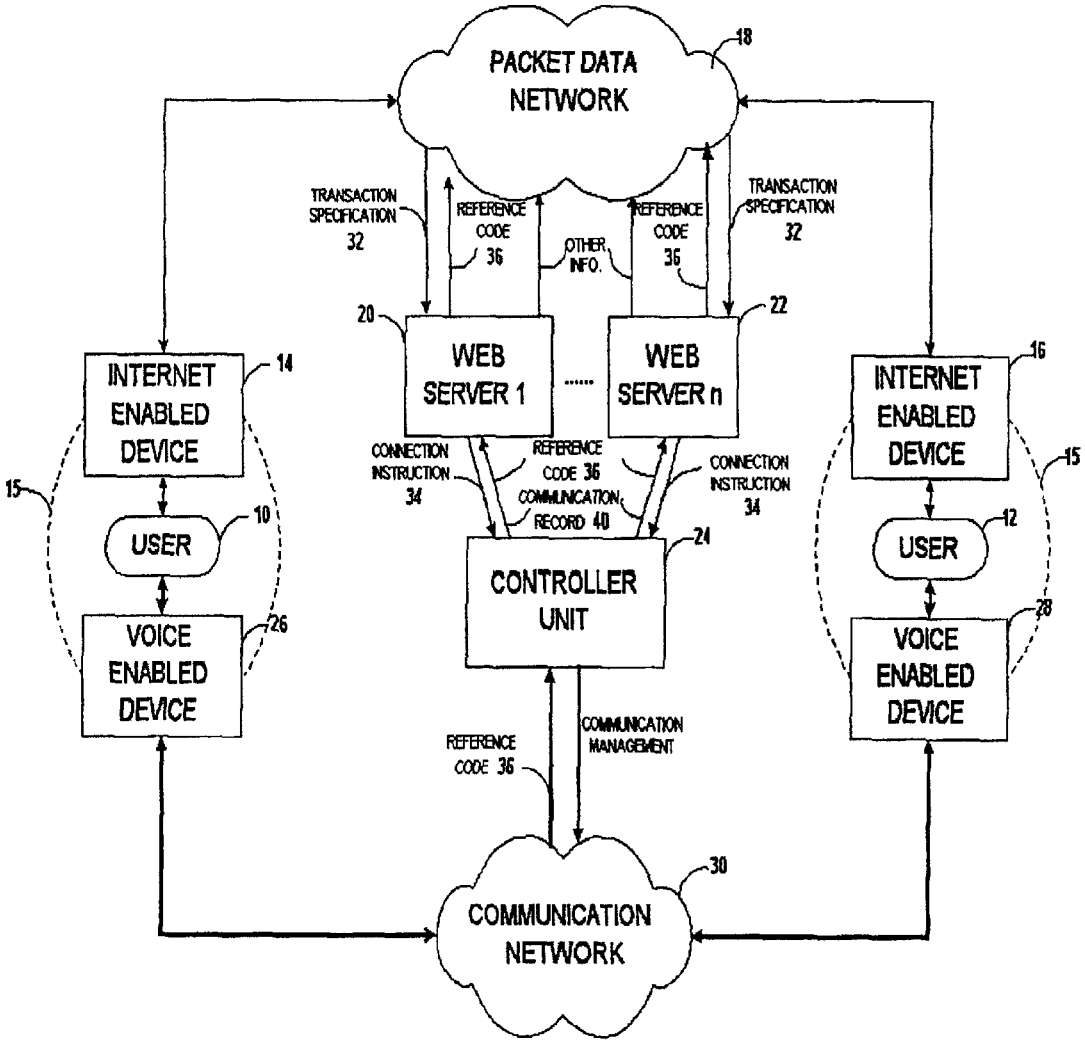

Turning to the Figures, FIG. 1 illustrates one service/system that integrates voice communication and anonymity. The system comprises (a) devices 14, 16 capable of transceiving packet data (henceforth referred to as "internet-enabled devices"), (b) a packet data network 18, (c) a communication network 30, (d) voice-enabled devices 26, 28, (e) controller unit 24, and (f) at least one server 20, 22. The internet-enabled devices 14, 16 can be variously implemented, including, without limitation, as desktop or laptop personal computers, as Internet appliances, and as PDAs or other handheld devices (e.g., smart phones with Internet accessibility). Voice-enabled devices 26, 28 enable users 10, 12 to conduct voice communications.

It is to be recognized that, although devices 14, 16 are shown separately from corresponding devices 26, 28, the functions of the respective devices may be provided via one apparatus, without departing from the principles of the invention. To illustrate, the devices 14 and 26, as well as the devices 16 and 28, may be integrated, e.g., as a Web-enabled digital cellular phone, and/or a connected personal computer with a speaker and microphone. Dotted lines 15 are set forth to indicate these configuration options.

The packet data network 18 typically is a packet switched network and preferably operates using open protocols. The network 18 generally is the Internet, but it can also comprise other publicly available networks, as well as private networks, such as a local area network (LAN) and/or an intranet. The packet data network 18 can also be a combination of these types of networks, or otherwise, so long as it provides the functions described herein.

The servers 20–22 may be variously implemented provided they support the functions described herein and, in particular, support the integration of voice communication and anonymity. Accordingly, servers 20–22 may be singular or plural in number.

The servers 20–22 preferably comprise Web servers implemented to host at least one and typically plural Web sites. Generally, such servers 20–22 host the front ends of such Web sites, which typically are otherwise independent (e.g. separately owned and/or operated) of the servers 20–22.

It is to be recognized that the servers 20–22, in providing a service to independent Web sites, may also be implemented to support (directly or indirectly) features, functions, services and applications other than the integration of voice and anonymity. That support reflects that the hosted Web sites may offer a variety of features, functions, services and applications (e.g., information marketplaces). These features, functions, services and applications may be recognized by users who access one or more of the Web pages typically comprising a hosted Web site. These features, functions, services and applications may also be unrecognized by (or even hidden from) users, such as, as examples, directory service, database inquiry, transaction processing, and security monitoring.

It is also to be recognized that the servers 20–22 may enable communication other than by voice. As such, the servers 20–22 may comprise email, fax, text messaging or other servers operating via packet data network 18. It is also to be recognized that the servers 20–22 may comprise gateways to the communication network 30, such as to provide voice messaging. In this latter example, the servers 20–22 may support either/both voice recognition (e.g., to acquire and identify all or part of incoming messages) and/or voice synthesis (e.g., to deliver messages with users, either in established network mailboxes or for personal delivery to the user or their message machine).

Controller unit 24 typically is implemented to manage and coordinate operation of the service/system so as to integrate voice communication and anonymity. In the case of an information marketplace, the unit 24 preferably provides for establishment of communication links between an initiator and an expert, particularly when the initiator requests voice communications, and while ensuring the anonymity of either/both the initiator and/or the expert.

Communication network 30 may be variously implemented. In one embodiment, the network 30 comprises a conventional, circuit-switched network (e.g., the public switched telephone network ("PSTN")). In another embodiment, the network 30 comprises a packet-switched network, such as the Internet, supporting VoIP. In still another embodiment, the network 30 comprises a private data network which embodiment tends to provide an enhanced service level (e.g., quality of service). In yet another embodiment, the network 30 is optimized to employ a combination of one or more of the above-described embodiments, depending on factors such as what technologies are available to each user, quality of service needs, user convenience, costs incurred and fees charged (e.g., user-selected fee rates), and the like.

It is to be recognized that although the communication network 30 and packet data network 18 are illustrated as separate elements in FIG. 1, the communication network 30 may be integrated with the packet data network 18. As an example, the communication network 30 need not be a circuit switched network. Moreover, the packet data and communication networks 18, 30 may be implemented using some or all of the same infrastructure. In a specific example, the networks 18, 30 may both be implemented to support TCP/IP or otherwise deploy or support the Internet in order to transmit data (e.g., the signals described above) and voice communication (e.g., VoIP).

The above-described components of the service/system are coupled among one another by wired or wireless technologies, or both. From coupling to coupling, these technologies may comprise network equipment, such as, but not limited to, servers, modems, routers, bridges and gateways. Such network equipment is well known and understood by one of ordinary skill in that art and, as such, is not shown in FIG. 1.

Various signals are transmitted between and among components of the service/system. The signals include transaction specification 32, connection instruction 34, reference code 36, and communication record 40.

Transaction specifications 32 include specifications, characteristics and other parameters (referred to sometimes hereafter, in the context of transaction specifications, individually and collectively as "parameters") associated with and describing a proposed transaction. These parameters preferably include the type of product/service being exchanged, the quality of the product/service, fees or other price, if any (e.g., pre-agreed fees), delivery or appointment time(s), and other related requirements. These parameters preferably also includes an indication as to whether there is a request for anonymous voice communication and/or any other specification of whether the transaction is to comprise voice communication. These parameters may also include additional information sought by the service/system, such as to obtain information (a) omitted from submitted transaction specification(s), (b) related to submitted transaction specifications, (c) sought by the service/system, and/or (d) combinations of these. Additional information, as an example, may include data as to which user initiates an appointed transaction wherein voice communication is requested/accepted and/or the related contact information for use by the service/system to preserve anonymity in establishing the connection for the applicable communication.

Transaction specifications 32 may be obtained from various combinations of user(s). As one example, only one of the users 10, 12 provides a transaction specification 32 in connection with a particular transaction. In such case, a user that does not provide a specification 32 typically will have furnished the same, similar or sufficient information, in advance, to the service/system. That information preferably is relevant to transactions generally (e.g., fees, times available, etc.). Also, that information may be provided actively (e.g., by completing information requests of the service/system) or passively (e.g., by the service/system's collection of data and/or data mining of same in the context of the user's history of transactions). In having furnished such advance information, a user is relieved of providing a transaction specification 32. It is to be recognized, however, that this relief may be case-by-case (e.g., as to specific transactions, or parameters thereof, such as, a listed user) and/or time-to-time (e.g., as to transaction posed for certain time frames), such that, in any particular case or time, this user may ultimately submit a transaction specification 32 (e.g., when polled by the service/system).

In an alternative, one user may be relieved of providing a transaction specification because the system/server effectively provides that user's transaction specification. This circumstance may arise variously, e.g., based on the business model or other operation standards of the service/system. In a particular case of this alternative, the system/server or either/both users may establish that only the transaction specification 32 of the user initiating communication is to be obtained/recognized (e.g., in an information marketplace, the initiator's transaction specification 32 controls). In another particular case, the system/server or either/both users may establish that only the transaction specification 32 of the user sought for communication is to be obtained/recognized (e.g., in an information marketplace, the expert's transaction specification 32 controls). In any case, the relief may be case-by-case and/or time-to-time, as described above.

As an extension of the above, the service/system also supports operation wherein neither party provides transaction specifications 32. In accordance with the above, this extension responds to both users providing advance information relevant to transaction specifications 32. Based on that information (and perhaps responsive to observed patterns of a user's conduct, e.g., Web surfing), the service/system determines one or more transactions that may be available and/or appropriate to the users. Preferably, the service/system provides to each user the parameters of the transaction(s) available to the respective user (e.g., via servers 20–22, as Webpage content, as an email, as an instant message, as a fax (Internet- or POTS-based), and/or as a voice message). The service/system may be implemented to schedule a particular transaction, or suggest a schedule for same.

As another example, both users 10, 12 provide transaction specifications 32. This example admits various cases. In one case, the transaction specifications 32 are the same. This case applies where the specification have character-by-character congruence. This case also applies where one user acknowledges the other's specification, either explicitly or tacitly (e.g., where the specification is negotiated to agreement between the parties in advance, as described further below). This case yet also applies where one user abdicates, for whatever reason, to the other user's specification.

In another case, the transaction specifications are different. In this case, one or both user(s) may provide information, which is specific to that user or otherwise irrelevant to, outside the knowledge of, and/or not assigned by the service/system to be provided by, the other user. To illustrate, each user may provide a user name and/or contact information that differs from the other. To illustrate further, one user may provide data about the transaction that is required solely from that user by the service/system (e.g., in the context of an information marketplace, an expert is required to provide a curriculum as to the instant transaction). In either such case, the service/system may participate similar to as described above when one or no user provides transaction specifications 32 to relieve one or both users from having to provide certain information in the respective transaction specifications 32 (e.g., the same or different information for each user), including, or not, from case-to-case and time-to-time.

Transaction specification(s) 32 may also involve various processes. As an example, one or more users may submit a transaction specification 32 based on negotiation with the other user and/or the service/system. The negotiation may be conducted via a communication network (e.g., POTS or fax) and/or a packet data network (e.g., email and/or instant messaging) and/or otherwise. In one alternative, the negotiation may be conducted, in whole or in part, via the service/system. In one form of this alternative, the negotiation may be conducted via the transaction specifications 32, where these specifications are submitted and, as necessary, iteratively re-submitted by each of the negotiating users (and/or the service/system) toward reaching agreement. At the same time, the negotiation may be conducted via the service/system other than through use of the transaction specifications 32. In any case, any such negotiation preferably culminates in each submitting user's submission of a transaction specification that is final to the transaction.

In any case, a negotiation generally implicates some or all of the parameters of the transaction. Following negotiation of the implicated parameters, the submitting users preferably submit respective specifications 32 reflecting the agreements with the other users and/or service/system. If not all parameters are negotiated to agreement; the submitting users may submit the transaction specification 32 based on an implementation wherein the service/system arbitrates the undecided parameters. In such case, the service/system may be implemented not only to arbitrate the undecided parameters, but also to mediate agreement on such parameters (e.g., by providing alternatives of same to users), and/or to determine such parameters and/or to suggest changes or determine changes to otherwise agreed on parameters.

In the context of an information marketplace, an initiator and expert may engage in a negotiation process toward agreeing on the parameters of one information transaction (or plural information transactions), and submission of one or more specifications 32 relating to the information transaction. The negotiation may involve give and take by both participants. On the other hand, the negotiation may be straightforward, such as if the expert simply accepts the parameters proposed by the initiator, or vice versa (e.g., the initiator may accept all the parameters set forth by the expert via Web pages or otherwise via the service/system). In this context, the participants may submit separate-but-congruent transaction specifications, or they may submit only one transaction specification between them, with the non-submitting participant either acknowledging that specification (e.g., an express indication that the participant has reviewed and approved the specification) or not.

The transaction specification(s) 32 preferably are obtained through the packet data network 18. More specifically, the transaction specifications preferably are obtained via servers 20–22, e.g., as Web page content, as email, as instant message, as an Internet-based fax and/or otherwise. However, the transaction specifications may be obtained via the communication network 30, e.g., as POTS-based fax and/or as a voice message. In this latter aspect, the transaction specifications preferably are obtained and recognized automatically, e.g., through voice and or character recognition.

A connection instruction 34 provides information on a proposed connection between users 10, 12. A connection instruction's information may be variously configured, e.g., from service/system to service/system, or from type to type. As an example, a connection instruction 34 may include one or more of a connection's type (e.g., email, chat, voice, video, etc.), time frames (e.g., day/date for initiation and conclusion), connection process (e.g., which user(s) initiate, via what network(s) and how), charging method (e.g., by duration, connection time or fixed sum) and contact information (e.g., phone number, IP address, domain name, Web server information, security information, chat alias and/or email address). Generally, the connection instruction(s) 34 include contact information of at least one user in the proposed communication.

As an illustrative example, the servers 20–22 provide one or more connection instruction(s) 34 in association with an applicable transaction between users 10, 12. The servers 20–22 preferably generate connection instruction(s) 34 based on and/or responsive to one or more transaction specifications 32. The servers 20–22 may also generate connection instruction(s) 34 based on and/or responsive to information stored within the service/system, such as within databases associated with one or more servers 20–22 (e.g., user profile databases). This latter information may include, as non-exhaustive examples, either/both associated billing preferences and/or contact information.

The servers might not have access to the same transaction instruction(s) and/or the same information from other sources, including databases. Accordingly, a transaction may associate with plurality of connection instructions 34. These instructions may not be equivalent. Typically, however, they are complementary or supplementary of one another.

Also as an illustrative example, a connection instruction 34 is assembled from information extracted from one or more transaction specifications 32. In the specific case of transactions involving voice communication, one or more servers 20–22 extract information relevant to voice communication (e.g., voice communication request, connection time frame, payment method, who initiates the call, etc.) and assemble that information into one or more connection instructions 34. These connection instructions 34 may provide for voice communication in combination with one or more other forms of communication.

If the transaction specification 32 directs other than voice communication, the applicable servers 20–22 extract and assemble a connection instruction 34 relevant to that communication type. In this latter case, however, the service/system may also be implemented to provide connection instructions 34 that cover voice communication (i.e., even if not originally requested). To do so, the service/system may provide the information for voice communication either in a separate connection instruction or integrated in one connection instruction.

Servers 20–22 preferably forward connection instructions 34 to the controller unit 24. It is to be recognized that the controller unit 24 may receive connection instruction(s) from multiple, independent servers. It is also to be recognized that the controller unit 24 may be implemented to generate connection instructions, either instead of or in conjunction with the servers 20–22 (e.g., where transaction specifications are obtained via the communication network 30, e.g., as POTS-based fax subject to character recognition and/or as a voice messaging subject to voice recognition). In this latter case, the connection instructions 34 preferably are based on and/or responsive to one or more transaction specifications 32, together with or apart from information stored within the service/system, such as within databases associated with one or more servers 20–22 (e.g., user profile databases).

The controller unit 24 preferably stores the connection instruction(s) 34. The storage can be variously implemented, e.g., in format, duration and/or comprehensiveness. As an example, the storage may be terminated after the applicable communication is completed, so as to erase the associated information. As another example, only a portion of the storage may be terminated and/or some information archived, with any retained information used for various purposes, e.g., such as for billing or tracking purposes.

The controller unit 24 preferably also is implemented to generate one or more reference codes 36 in association with an applicable transaction between users 10, 12. The controller unit preferably generates the reference codes 36 based on and/or responsive to one or more connection instructions 34. In that, each reference code 36 preferably corresponds uniquely to the implicated connection instructions 34.

It is to be recognized that the controller unit 24 may also generate reference codes 36 based on and/or responsive to information stored within the service/system, such as within databases associated with the unit 24 and/or one or more servers 20–22 (e.g., user profile databases). This generation may be apart from or, preferably, together with one or more connection instructions 34.

It is also to be recognized that the controller unit 24 may be implemented to generate reference codes based on and/or responsive to information obtained directly from one or more transaction specifications 32. The unit 24 may so generate together with or apart from one, plural or all connection instructions 34. The unit 24 may so generate together with or apart from some or all information stored within the service/system (e.g., contact information).

In any case, reference codes 36 preferably are generated in association with transactions so as to uniquely correspond thereto. In particular, reference codes 36 preferably are generated to enable the connection process associated with transactions. In addition, reference codes 36 are generated to enable tracking of transactions. As to the latter, in information marketplaces, reference codes provide for tracking a user's information transactions and, in particular, enable identification and cataloging of such user's various information transactions. As previously described, tracking responds to the circumstance that a user will tend to have a history of transactions and, at any given time, may be involved in several transactions, with each such past and current transactions typically having different attributes and connection criteria. Tracking transactions preferably is implemented so as (a) to differentiate among transactions, even if the transactions are between the same two users and (b) to record, for each such transaction, the transaction's attributes, such as, but not limited to, the parameters and other information associated with transaction specifications and/or, if any, connection instructions and/or other service/system information (e.g., fees or other pricing, actual elapsed time).

Reference codes 36 may be variously implemented. In one implementation, reference codes 36 comprise one or more, and generally combinations of, letters, numbers and symbols. In other implementations, reference codes 36 may comprise graphics, images, video, and voice patterns, or combinations of these, with or without any letters, numbers or symbols. Reference codes may comprise one or more groups of the above, (e.g., if the reference code comprises a code body and password, it may be provided as one or two sets of numbers, letters, etc.). Reference codes may also be provided variously to user(s), including, as examples, visually (e.g., by screen display, printed document, video), audibly (e.g., by voice or voice mail) or by methods hidden from a user's perception.

In addition to generating reference codes 36, the controller unit 24 preferably also provides for storing such codes. The storage can be variously implemented, e.g., in format, duration and/or comprehensiveness. As an example, the storage may be terminated after the applicable communication is completed, so as to erase any or all associated information. As another example, only a portion of the storage may be terminated and/or some information archived, with any retained information used for various purposes, e.g., such as for billing or tracking purposes and/or so that reference codes can be recycled for use in future transactions. (Storage of reference codes is further described below in connection with reference code database 100.)

In addition to generating reference codes, the controller unit 24 preferably also provides for transmission of reference codes to one or more users in the applicable transaction. Preferably, the unit 24 so provides via the packet data network 18. As an illustrative example, the unit 24 so provides by furnishing the respective codes 36 to one or more selected servers 20–22, enabling the servers 20–22 to transmit the codes 36 to respective users 10, 12 via the network 18. The selected servers 20–22 may be Web servers, email servers, chat servers, Internet-fax servers or otherwise. In the case of a Web server, the user preferably is enabled to access the codes either audibly, visibly and/or in a secure, hidden form (e.g., so that only the system—preferably authenticated—recognizes and can act on all or certain of the codes).

It is to be recognized that the unit 24 may be implemented to provide the reference codes via the communication network 30, together with or apart from provision via the packet data network 18. In this implementation, the unit 24 preferably transmits the codes via a PSTN gateway (e.g., for voice or standard fax transmission). In voice transmission, the unit 24 typically employs voice synthesis for communication and, preferably, has access to voice mail, either PSTN-supported or via a subscriber's private answering machine. Provision of the reference codes via the communication network 30 may be together with, or apart from, provision of such codes via the packet data network 18.

In the provision of references codes 36 to users, various approaches may be taken, particularly based on enabled and/or applicable connection processes. In one example, an information marketplace may be implemented so that (a) the initiator receives a reference code, but the expert does not, or (b) the expert receives a reference code while the initiator does not, or (c) both parties receive the reference code, or (d) neither party receives the reference code (e.g., a form of immediate connection).

In their provision to users, the reference codes 36 typically enable the connection process. In one example of a connection process, one or more reference codes are provided together with contact information. In another example of a connection process, one caller may be volunteered, assigned or otherwise designated to initiate contact (the "designated caller"). The designated caller typically initiates contact with the other user via the controller unit 24, particularly through one or both of the packet data or communication networks 18, 30. In doing so, the designated caller typically submits their reference code. That submission may be accompanied, or not, by the other user submitting their reference code.

In the connection process, the submission of reference codes may be accomplished variously. As examples, a user may submit reference codes by voicing the reference code (e.g., via VoIP or POTS), by keying in the code (e.g., for Internet submission via chat, email, or the like, or for POTS submission via tone or pulse coding), or combination or otherwise.

The service/system receives the reference codes so entered by one or more users and determines whether the codes are proper. If the entered codes are proper, the service/system establishes connections (e.g., VoIP and/or telephone calls) between/among users. Codes may be proper under various criteria (e.g., all or part of the entered codes matches exactly another entered code (or part thereof) and/or matches such other entered code under predetermined criteria and/or matches exactly, matches under predetermined criteria or is otherwise in accord with code records).

The connection process typically includes, but is not limited to, receiving, storing, inputting and processing reference codes. Although the process above describes user input of reference codes, the connection process may be entirely or partially automated, e.g., by using a software program or hardware component in a user's communication device and/or in connection with the controller unit 24 or servers 20–22.

In the connection process, a controller unit 24 preferably retrieves connection instructions) 34 associated with a transaction identified to a received reference code. The connection instructions 34 typically are previously stored in a database associated with the unit 24 and/or with one or more servers 20–22. The connection instructions 34 are retrieved so as to enable connection management (e.g., by the controller unit 24) of the connection associated with the received reference code.

In an example of management by the unit 24, the unit 24 connects the designated caller to the called party using contact information. In another example, the controller unit may reject the designated caller's request for voice connection with the other transacting party if the calling time does not satisfy a pre-agreed calling time frame. In yet another example, the controller unit 24 generates communication records 40. The unit 24 typically generates such records, e.g., during the connection, via monitoring the transaction (e.g., particularly voice communications supporting anonymity). The communication records 40 typically include various data associated with transactions, e.g., the identities of communicating parties, billing information, transaction reference code (for the purpose of identifying each specific transaction), the starting time and duration of the communication, among other data.

Figure 2:
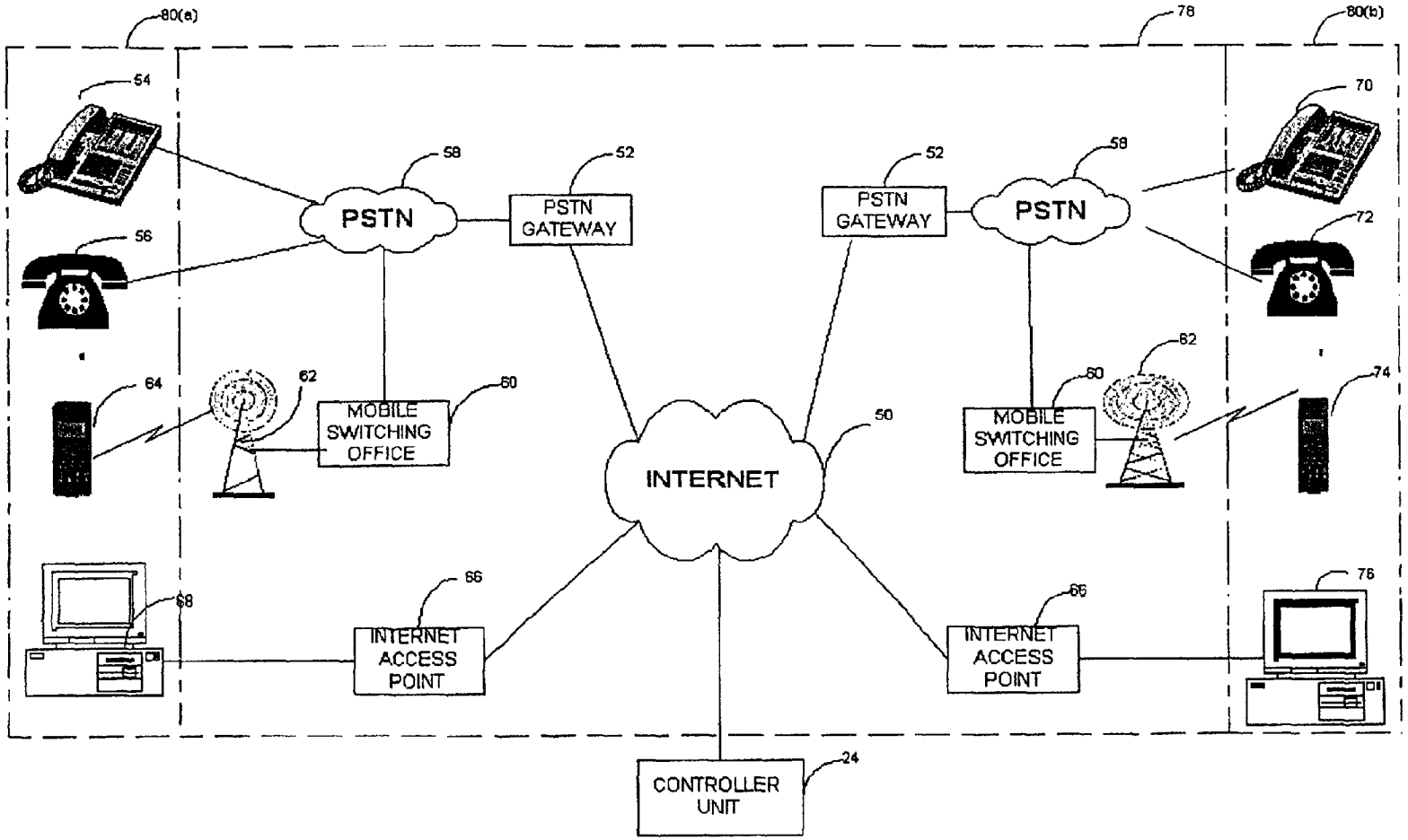
FIG. 2 shows a simplified diagram of an Internet based communication system, FIG. 3 provides a block diagram showing one embodiment of the controller unit.

FIG. 2 illustrates an example of a communication network 30 (shown in box 78) and an example of voice-enabled devices (shown in boxes 80(a) and 80(A)). Here, the communication network 30 employs the Internet 50, and comprises one or more of each of Internet access points 66, public switched telephone networks (PSTN) 58, PSTN gateways 52, mobile switching offices 60 and other mobile infrastructure, such as base stations 62. Although the illustrated network 30 employs the Internet (actually or effectively a public network), it is to be recognized that the network 30 may be implemented to employ one or more private networks. Such private networks may be employed together or apart from any public network, such as the Internet. Such private networks typically are employed to provide features, functionality or performance that may not be available through a public network, e.g., to ensure quality of service and/or provide security features.

PSTN gateways 52 provide an interface between the PSTN 58 and the Internet 50. The PSTN gateways 52 preferably provide a voice grade interface. The PSTN gateways 52 typically comprise one or more computers, switches and/or similar equipment for processing telephone calls. The PSTN gateways typically perform various functions such as (a) the conversion and compression of analog signals from the PSTN to digital signals for transmission via the Internet 50 and (b) decompression and conversion of digital signals received via the Internet 50 into analog signals for transmission via the PSTN.

In FIG. 2, traditional telephone terminals 54, 56, 70, 72 illustrate implementations of one or both voice-enabled devices 26, 28. These terminals 54, 56, 70, 72 are connected to PSTN 58. The PSTN system 58 typically comprises multiple control and switching points that are connected via trunk circuits and signal links.

Wireless terminals 64, 74 illustrate other implementations of voice-enabled devices 26, 28. Wireless terminals 64, 74 may comprise any of screen phones, smart and/or super phones, or wireless PDAs, or other similar device. Wireless terminals 64, 74 communicate with base stations 62. Base stations 62 typically are fixed in location for communicating with wireless terminals within a specific geographical range. Within that specific geographic range, base stations 62 may also be responsible for coordinating all wireless terminals 64, 74.

In turn, the base stations 62 communicate with a mobile switching office (MSO) 60. The MSO generally is responsible for coordinating activities between different base stations 62. The MSO 60 is connected to PSTN 58 for landline communications.

Personal computers (PCs) 68, 76 illustrate still other implementations of voice-enabled devices 26, 28. PCs 68, 76 typically comprise desktop or notebook computers equipped with voice input/output devices and various software, including application and utility programs directed to communication. PCs 68, 76 typically also include a communication interface, including, as examples, a modem, ISDN card and/or LAN interface card. Via respective such communication interfaces, PCs 68, 76 are connected to the Internet through Internet access point(s) 66. Internet access points 66 generally provide protocol conversions, as necessary, for two-way data communication over the Internet. For example, an Internet access point 66 may comprise multiple modems coupled to an Internet router, the router providing a ramp with the Internet.

In a communication network 30 configured as in FIG. 2, voice data may be transmitted through the Internet between various terminals (voice enabled devices). For example, users may establish communication links between traditional telephone terminals, wireless terminals, and PCs. Associated with the network 30 is the controller unit 24, here implemented as a node on the Internet. In this association, the unit 24 is enabled to manage and otherwise direct voice communication between users. Preferably, in doing so, the unit 24 operates according to one or more applicable connection instructions 34, and/or other criteria maintained within the service/system.

The communication network 30 of FIG. 2 is to be recognized as an example implementation. As such, the network 30 may be otherwise configured within the scope of the invention. For example, additional hardware, software and/or other infrastructure may be implemented (e.g. wireless gateways and appropriate communication protocols), so as to support an enhanced (e.g., more comprehensive) wireless data network and, in turn, so that wireless terminals 64, 74 may be associated with communication links that employ the Internet independently of PSTN.

Figure 3:
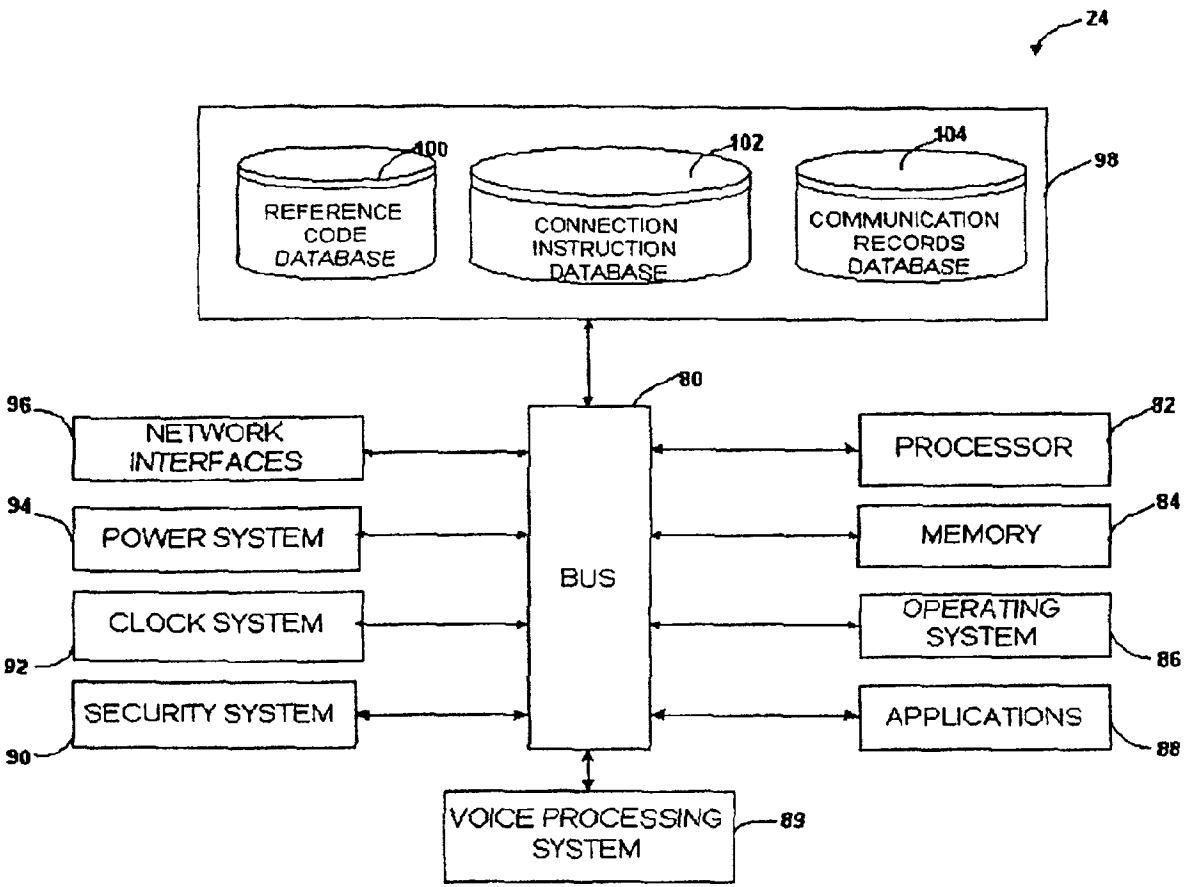

FIG. 3 illustrates in block diagram form an example implementation of controller unit 24. In this implementation, controller unit 24 comprises various components, including processor 82 (e.g., a microprocessor or multi-processor configuration), memory 84 (e.g., cache and or other forms of volatile/non-volatile semiconductor memory), operating system 86 (e.g., including a directory service and or to enable operations of the controller unit 24), applications 88, voice processing system 89, security system 90 (e.g., to protect private data stored in the controller unit), clock system 92, power system 94, network interfaces 96, data storage 98 and bus 80 (e.g., to couple the unit's components).

Voice processing system 89 preferably performs one or both of voice recognition and speech synthesis. The system's synthesis of speech typically is to articulate voice prompts (e.g., relating or according to text commands). The system's recognition of voice typically is to enable the controller unit 24 to respond to users' voiced input. That is, with voice recognition, users are enabled to input, e.g., spoken requests for connection and/or input of reference codes, such as in the form of voiced numbers, letters and words. Where both synthesis and recognition are implemented, users may interact with the controller unit 24 through voice communication, whether the conduit is packet data network 18 or communication network 30.

Network interfaces 96 generally enable communication between, on the one hand, controller unit 24 and, on the other hand, networks 18, 30 and/or other elements of an implemented service/system with which the unit 24 interfaces, whether directly or indirectly. The interfaces 96 preferably comprise network adapter infrastructure and, as such, provide various signal conditioning/conversion functions. The interfaces 96 typically handle one or more data types, including, as examples, analog, digital, broadband, wireless, and optical data.

Data storage component 98 preferably includes a plurality of databases. Such databases may enable communications, as contemplated herein. Accordingly, one or more databases may be employed in connection with, and/or for the purposes of, scheduling, organizing, establishing, maintaining, tracking and/or otherwise enabling a transaction.

The databases preferably include one or more of the following: reference code database 100, connection instruction database 102 and communication records database 104. Communication record database 104 may be implemented to provide various functions, including, as an example, storing communication records 40 for selected current and previous transactions. The database 104 may also be implemented to store other information, including, as examples, one or more of user codes, contact codes, connect criteria based on contact codes, and/or analytical data, all as described above.

Reference code database 100 may be implemented to provide various functions, including, as examples: storing reference codes 36 that are reserved or otherwise assigned, tracking reference codes that are in current use, identifying reference codes 36 that are to be deleted or otherwise terminated (e.g., after the scheduled transaction or expiration of some other period of time), identifying or determining reference codes that are recyclable or otherwise available for use, and otherwise maintaining reference codes 36.

Connection instruction database 102 preferably stores connection instructions and/or contact information. The database 102 may be implemented to store only such contact information of users available for voice communication service. However, the database 102 preferably is implemented to store contact information for any user available for communication through the service/system. The database 102 may also be implemented to store other information, including, as examples, one or more of user codes, contact codes, connect criteria based on contact codes, and/or analytical data, all as described above.

The data storage component 98 may also be implemented to support other databases, including outside the controller unit 24. Such databases may store or provide for information, including, as examples, user codes, contact codes, connect criteria based on contact codes, and/or analytical data, all as described above.

In an example embodiment employing each of the databases 100, 102, 104, reference code database 100 stores reference codes 36 that are applied to index some or all of the information stored in either/both of connection instruction database 102 and communication records database 104. As such, the reference codes are employed for storing, retrieving and/or updating of transaction information of implicated databases 102, 104. In operation under this embodiment, processor 82 uses reference code(s) 36 to generate one or more queries of data storage component 98 so as to retrieve information pertaining to that reference code and relevant to the query, such as information from or relating to connection instructions 34 and/or communication records 40.

Although controller unit 24 is illustrated using the elements depicted in FIG. 3, it is recognized that this provides only an example implementation of the controller unit 24. It is further recognized that other implementations exist, such as combinations omitting or replacing some of the depicted components, and/or adding components.

Figure 4A:
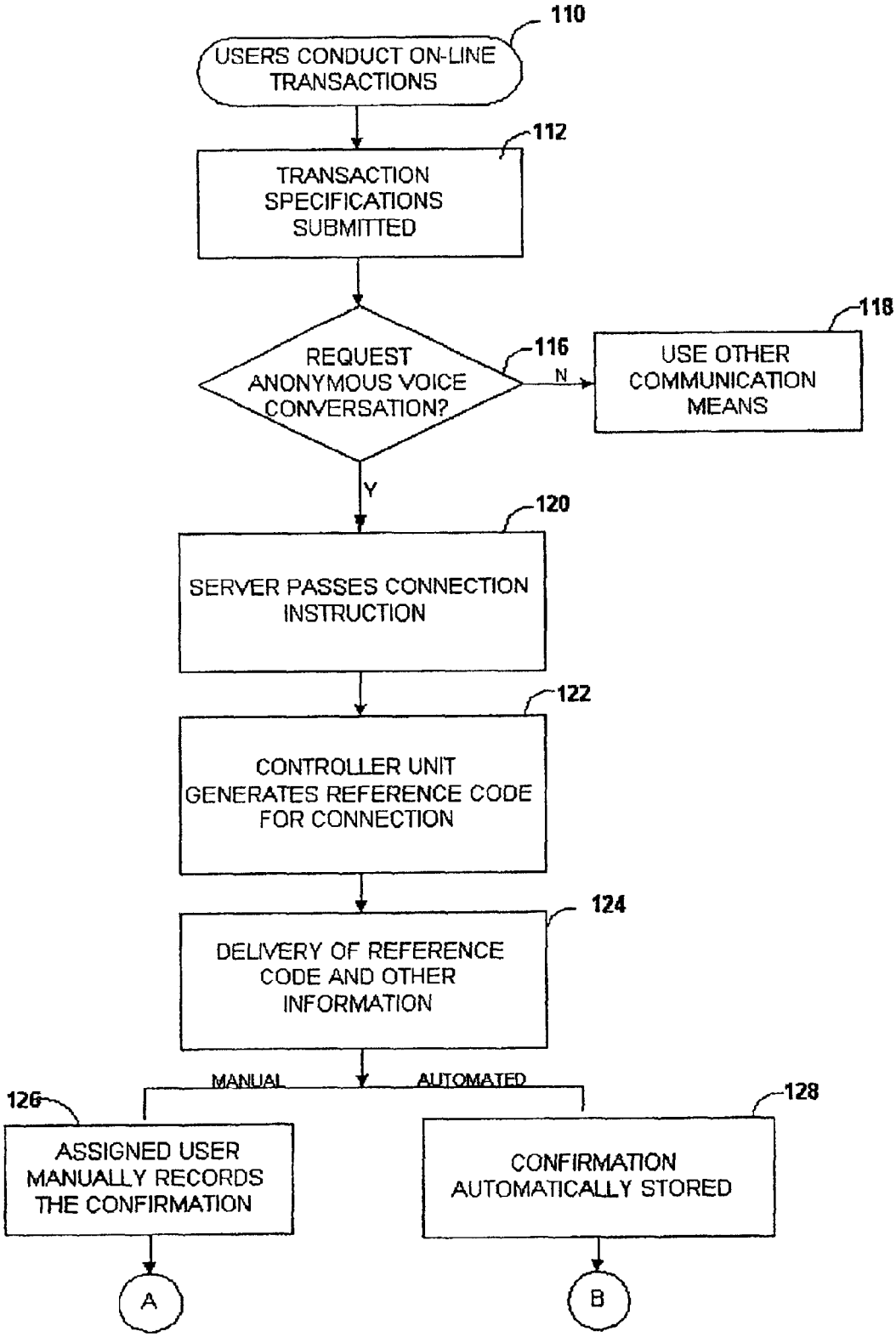
FIG. 4A illustrates an embodiment showing the process of how a reference code is generated for each anonymous voice communication request from end users.
Figure 4B:
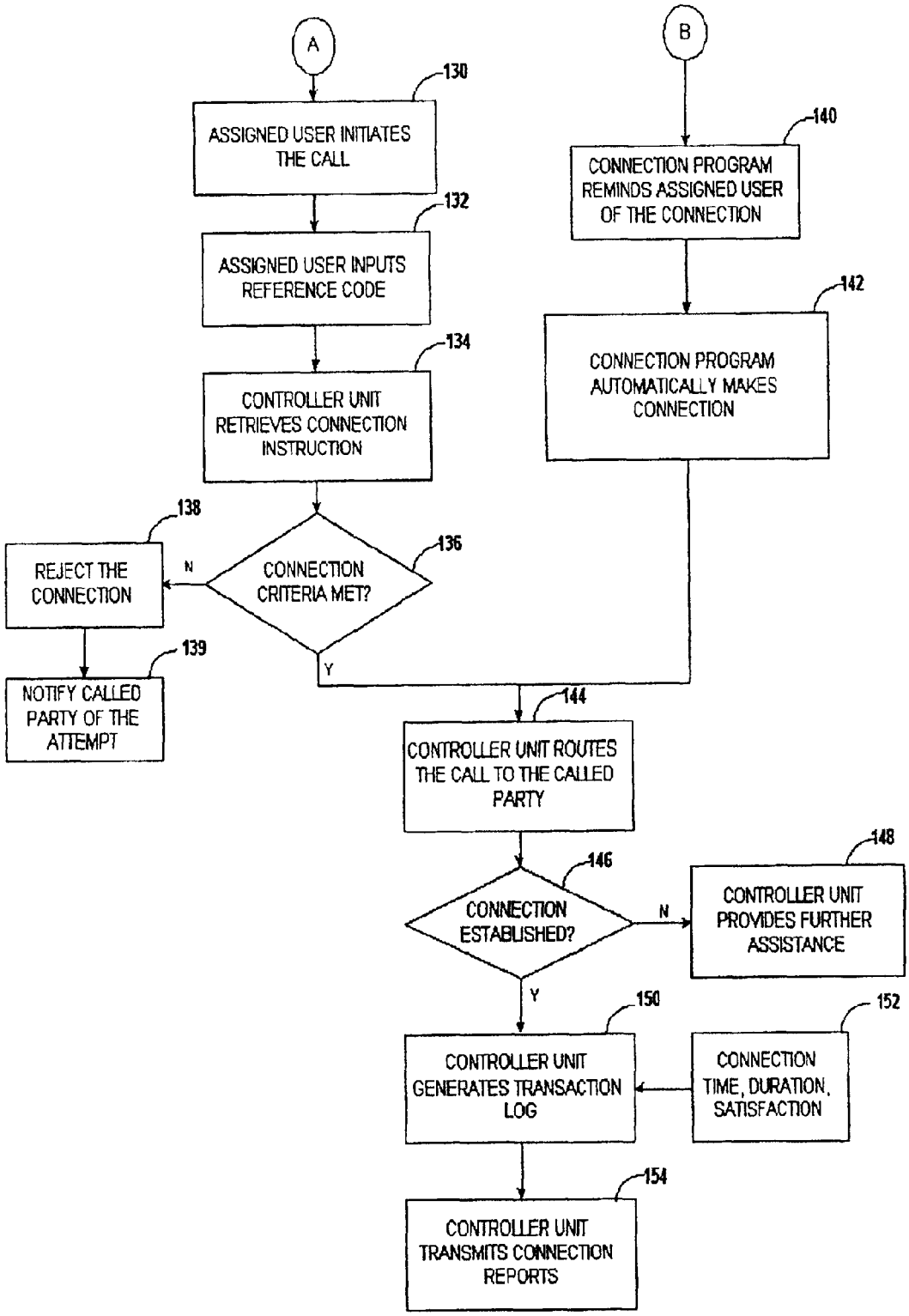
FIG. 4B illustrates an embodiment of the process to establish anonymous connection between two parties using the reference code.

FIGS. 4A and 4B illustrate an example process for voice communication supporting anonymity. In step 110, users conduct one or more on-line transactions. For these purposes, users typically conduct a transaction via one or more of the Web, chat, or email. Moreover, a user's transaction typically is directed to any interaction, exchange or other transaction involving goods or services, directly or indirectly. A transaction's goods/services may include, among other things, and not limited to: hard goods (e.g., electronics, books, and the like), professional services (e.g., travel and employment agency), content (e.g., entertainment such as audio, video, and/or game content), intellectual property (e.g., assignment or licensing of patents, trademarks, copyrights, etc.), knowledge (e.g., research studies), and/or information/data (e.g., domestic sales figures, mortgage rates, etc.). A transaction may involve one or more fees, including a fee for the service/system and/or a fee for the person or entity that provides goods or services.

An example context for users conducting on-line transactions is an information marketplace. There, as also described above, a user is an initiator if they post an inquiry. In connection with the posting, the initiator may also include related requirements, such as a price target or maximum, a quality characteristic, a preferred delivery method, etc. The initiator generally posts on a virtual bulletin board, e.g., supported via the Internet. The initiator typically receives a response from one or more other participants (e.g., experts) in the marketplace, which generally is directed to the initiator's requirements, e.g., by providing a bid. The initiator may select none, one or more of the experts, typically at their sole discretion. The initiator may also continue the on-line transaction(s) with one or more of the experts toward negotiating a transaction specification 32 and, if that is satisfactorily accomplished, possibly selecting the expert.

In this example process, users involved in a transaction ("transacting users") submit, in step 112, a mutually agreed transaction specification 32. As described above, that submission preferably is via servers 20, 22 (e.g., Web servers).

In step 116, the example process tests for whether the transaction specification 32 includes a request for anonymous voice communication (e.g., via immediate or later-scheduled connection). If anonymous voice communication is not requested, the transaction proceeds by other means, as indicated by step 118. If anonymous voice communication is requested, server 20, 22 passes, in step 120, one or more connection instructions 34 to controller unit 24. In step 122, controller unit 24 stores the connection instruction 34 (e.g., in connection instruction database 102). In step 122, controller unit 24 generates a reference code 36 associated with the transaction implicated by the connection instruction 34. It is to be understood that, while the controller unit 24 is described for this example process as, in the same step, both storing the instruction 34 and generating the code 36, the unit 24 may (a) perform those functions in separate steps and (b) may generate the code 36 in the absence of the storing activity.

In step 124, the reference code is delivered to one or both of the transacting users (a "confirmation"). In an illustrative case, confirmations include contact information. In another illustrative case, confirmations may be delivered only to a transacting user assigned to initiate the communication (e.g., the designated caller in the information marketplace context). Confirmations preferably are delivered through packet data network 18, as previously described.

In step 126, the user assigned to place the call (e.g., the designated caller) manually records the confirmation. For example, the user records some or all of the confirmation by writing it down, printing it out and/or storing it in memory.

In step 130, the assigned user initiates the connection process. The user typically does so by contacting controller unit 24 using a voice enabled device 26, 28 (e.g., via a voice interface) or using an Internet enabled device 14, 16 (e.g., via entries in a Web page).

In step 132, the assigned user is prompted to enter the reference code applicable to the transaction. In step 134, the controller unit 24 receives the reference code so input by the assigned user and retrieves the connection instruction 34 associated with that reference code. In an example case, the controller unit 24 retrieves that connection instruction 34 from connection instruction database 102.

In step 136, controller unit 24 tests whether connection criteria of the connection instruction are satisfied. This testing preferably includes verification of the initiating user's identity and agreement with the connection's scheduled time. If the connection criteria are not met, the connection is rejected, in step 138. Following such rejection, the service/system may be implemented to provide, as a step 139, notice to the called party of the rejected connection. Such notice, if implemented at all, may comprise the identity of the initiating user (or, at least, of the proper initiating user), details of the scheduled transaction/connection, and the basis for rejecting the connection.

If the connection criteria are satisfied, the process proceeds to step 144 wherein the controller unit 24 routes the call to the called party.

Alternatively to step 126, the confirmation may be stored automatically (i.e., without the user's action). Such storage typically is provided using a hardware, firmware and/or software (collectively, the "connection program").

The connection program preferably is implemented not only to automatically store the confirmation, but also to automatically retrieve all or part of the confirmation. In so retrieving, the connection program preferably either/both reminds the user of the connection (step 140) and/or obtains the user's authorization to automatically initiate the connection at the scheduled time, including by providing the reference code (step 142). Steps 140 and 142, in an example case, may be implemented in a device that is both packet- and voice-enabled, e.g., an Internet-enabled cellular phone (hereafter referred to as a "dual-enabled device").

Figures 5, 6:
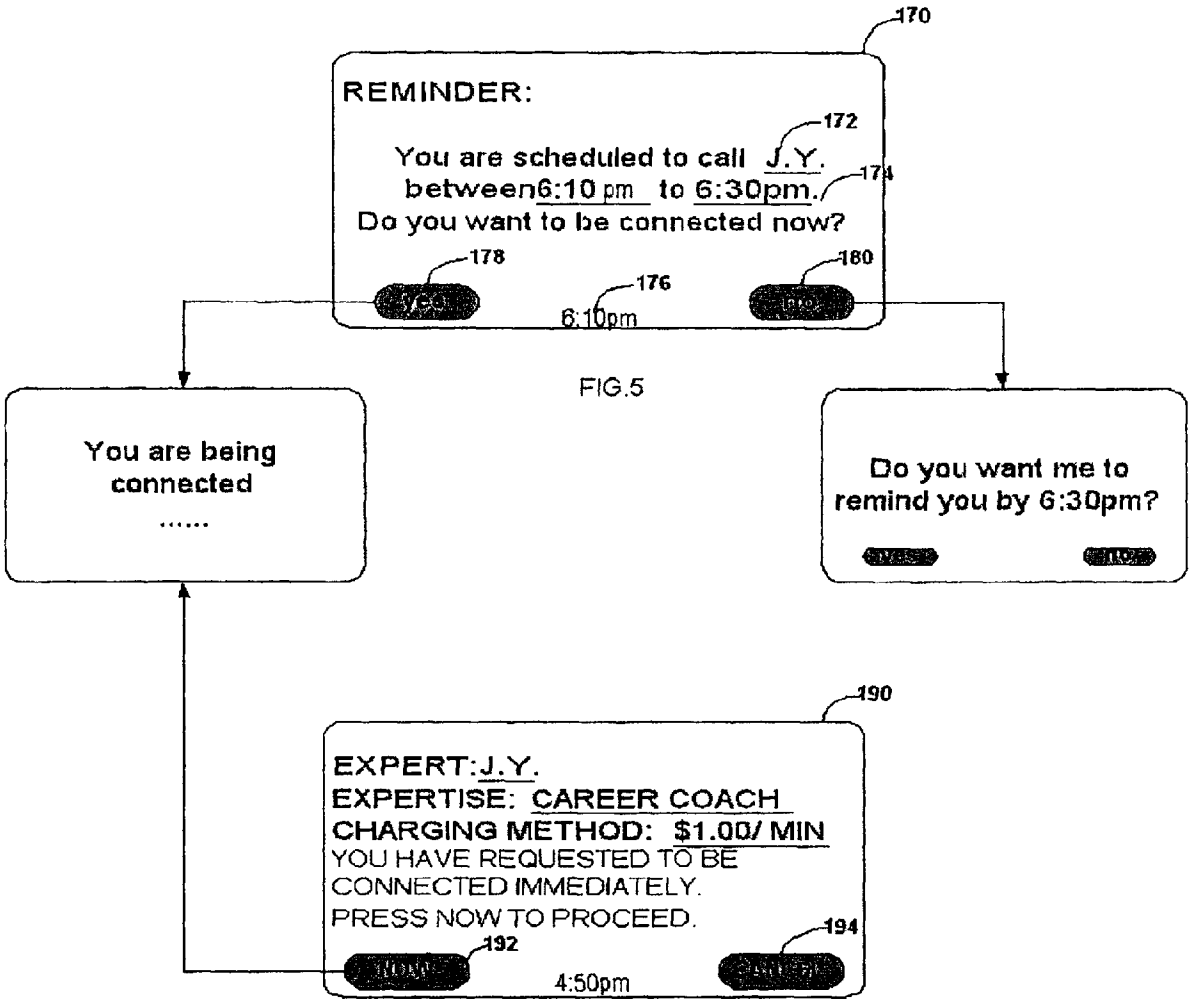
FIG. 5 shows an exemplary user interface for the reminder function.
FIG. 6 shows an exemplary user interface to utilize the automatic connection function.

It is to be recognized that, in a fully automated system, step 140 may be selectable (e.g., by the user) or may be omitted. If selectable, step 140 may be made variously configurable. For example, the user may be enabled to configure the connection program to provide one or more reminders of the scheduled connection time. The user may also be enabled to determine whether to proceed with connection. FIG. 5 depicts an example of a reminder as a user interface screen, which the connection program may cause to be presented on a dual-enabled device's display.

The service/system may also be implemented to support dual modes: one mode providing for manual reception and treatment of confirmations and another mode providing for automatic connections. In this implementation, if a user requests immediate connection in a transaction specification 32 (i.e., in step 112), the connection program immediately processes the connection, doing so automatically and in real time. This implementation provides that later scheduled (not immediate connection) transactions may proceed manually. In that alternative, this implementation may provide that a user may select manual or automatic, or both (e.g., automatic confirmation reception and reminders, but manual connection initiation), such as on a transaction by transaction base. FIG. 6 depicts an example of a user interface screen, which the connection program may cause to be presented on a dual-enabled device's display.

In step 144, controller unit 24 routes the call to the called party. The unit 24 preferably is enabled to do so via contact information provided in the associated connection instruction(s) and stored in the connection instruction database 102.

In step 146, the service/system tests whether a connection is established. If the called party cannot be contacted in accordance with the connection instructions, controller unit 24 may be implemented to provide further assistance, as step 148. In one example of further assistance, the unit 24 requests that the caller call again. The controller unit 24 may do so with a suggested time (e.g., based on information about the called party's schedule, whether maintained in storage or obtained at the time of the connection). The controller unit 24 preferably also notifies the called party, e.g., of the attempted connection and/or of the suggested time for the later call.

With connection established between the parties, the controller unit 24 preferably generates transaction logs, as step 150. Information being logged may include, as examples in step 152, the identity of communicating parties, billing information, reference codes (e.g., for the purpose of identifying the transaction), connection time, conversation duration, and satisfaction rating of each party. The logs preferably are stored in communication records database 104.

In step 154, connection reports are transmitted to servers 20, 22. At least some reports preferably are formulated based on the transaction logs. The servers 20, 22 (e.g., Web servers) employ the reports for, among other purposes, billing and record keeping.

As previously described, FIG. 5 depicts an example of a reminder as a user interface screen 170 in connection with step 140 of FIG. 4B. The user interface screen 170 can be presented on displays such as, as examples, of personal computers, Internet appliances, Internet-enabled PDAs and/or digital cellular phones. The screen 170 preferably includes information including, but not limited to, the identity 172 of the called party, the scheduled time for the transaction 174 and the current time 176. The screen 170 preferably also includes virtual buttons 178, 180 that are selectable (e.g., by tapping on them if the display is touch sensitive, or by clicking on them using a pointing device, such as a mouse, or by using corresponding keys on a keypad/keyboard).

As previously described, FIG. 6 depicts an example of a user interface screen 190 for an automatic connection feature associated with step 142 of FIG. 4B. In particular, the screen 190, as depicted, enables a transacting party to initiate an immediate connection (i.e., by selecting the "now" button 192). The screen 190, as depicted, also enables a transacting party to terminate the connection process (e.g., by selecting the "cancel" button 194).

Accordingly, the subject matter of this application is directed to privacy concerns through the establishment, maintenance and control of anonymity in the context of voice communication. To illustrate, the subject matter is directed to establishing, maintaining and controlling anonymity on the part of users and experts alike in information markets, particularly information markets involving the Internet.

In another aspect, the subject matter of this application is directed, in one aspect, to integrating voice communication and anonymity. That is, the subject matter is directed to enabling parties involved in an online transaction to communicate by voice while selectively preserving anonymity; e.g. each party can select what, if any, personal information is disclosed to the other.

In yet another aspect, the subject matter of this application is directed to establishing and controlling anonymity at the time of non-voice communication involving the Internet, then controlling and maintaining that anonymity for voice communication, whether that communication is transmitted via the Internet or other packet-switched technologies or that communication is transmitted via circuit switched technologies and services, such as PSTN/POTS.

The foregoing embodiments and features are for illustrative purposes and are not intended to be limiting persons skilled in the art capable of appreciating other embodiments from the scope and spirit of the foregoing teachings.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

[1. A method of facilitating anonymous communication between a first station and a second station, the second station having an address for communication, and each station being enabled to transmit and receive packet data and being connected directly to a packet data network, the method comprising:

providing a transaction specification from at least one of the first and second stations, generating a reference code in response to the transaction specification, there being a defined relationship between the reference code and said address, supplying the reference code to at least the first station, receiving a communication request from the first station, receiving the reference code from the first station, using the reference code to recover said address, and opening a channel for communication between said first and second stations, whereby anonymous communication can be established between the first and second stations without providing said address to the first station.]

[2. A method according to claim 1, wherein said address specifies a node on a circuit switched network.]

[3. A method according to claim 1, wherein said address specifies a node on a packet switched network.]

[4. A method according to claim 1, wherein said address specifies a node on a packet switched network, including Voice over IP.]

[5. A method according to claim 1, wherein the step of providing the transaction specification includes inputting said transaction specification through a packet data network.]

[6. A method according to claim 1, wherein there is a first party at the first station and a second party at the second station, and the step of providing the transaction specification includes the first party posting an inquiry, the second party posting a response, and the first party accepting or rejection the response.]

[7. A method according to claim 1, wherein the step of providing the transaction specification includes providing an interface that allows negotiation between parties at the first and second stations respectively regarding the transaction specification.]

[8. A method according to claim 1, wherein the step of providing the transaction specification includes inputting said transaction specification through a packet data network, including one of wired or wireless Internet.]

[9. A method according to claim 1, comprising generating a connection instruction based on the transaction specification.]

[10. A method according to claim 1, comprising generating the reference code based on a connection instruction.]

[11. A method according to claim 1, including storing a database of user profiles including said address.]

[12. A method according to claim 1, including supplying the reference code to the first station over a packet data network.]

[13. A method according to claim 1, including supplying the reference code to the first station over a circuit switched network.]

[14. A method according to claim 1, comprising storing the reference code until after the transaction has been completed and then erasing the reference code.]

[15. A method according to claim 1, comprising supplying the reference code to both the first station and the second station.]

[16. A method according to claim 1, comprising connecting the first station and second station for voice communication over a circuit switched network.]

[17. A method according to claim 1, comprising connecting the first station and second station for voice communication over a packet data network.]

[18. A method according to claim 1, comprising connecting the first station and second station for voice communication through voice over IP.]

[19. A method according to claim 1, comprising verifying the communication request against at least one criterion specified in the transaction specification before opening the channel for communication.]

[20. A method according to claim 1, comprising rejecting the communication request if at least one criterion specified in the transaction specification is not satisfied.]

[21. A method according to claim 1, wherein there is a party at the second station and the method comprises verifying the identity of the party at the second station before opening the channel for communication.]

[22. A method according to claim 1, wherein the method comprises generating a communication record including data regarding the transaction, including at least one of start time, end time, reference code, duration of communication, fee information, and billing information.]

[23. A method according to claim 22, wherein first and second identities are associated with the first and second stations respectively and the communication record includes at least one of the first identity and the second identity.]

[24. A method according to claim 1, comprising issuing a prompt to the first station to enter the reference code.]

[25. A method according to claim 1, wherein there is a first party at the first station and a second party at the second station, the first party is a purchaser of information and the second party is a seller of information, and the method comprises negotiating the transaction specification.]

[26. A method according to claim 1, wherein there is a first party at the first station and the method includes the first party initiating a request for communication.]

[27. A method according to claim 1, wherein the step of supplying the transaction specification includes specifying a time or time interval for the communication request and the method includes determining whether the communication request is received from the first station at the specified time or time interval.]

[28. A method according to claim 1, wherein the step of opening a communication channel includes attempting to establish a connection between the first and second stations, testing whether a connection is established, and, if not, scheduling a time for another attempt.]

[29. A method according to claim 1, wherein the method comprises receiving from the second station specified times or time intervals at which a party is available at the second station for communication.]

[30. A method of establishing anonymous communication between a first station and a second station, the second station having an address for communication, and each station being enabled to transmit and receive packet data and being connected directly to a packet data network, the method comprising:

supplying a transaction specification as packet data over the packet data network from at least one of the first and second stations to a controller, generating a reference code in response to the transaction specification at the controller, there being a defined relationship between the reference code and said address, supplying the reference code from the controller to at least the first station, making a communication request from the first station to the controller, supplying the reference code from the first station to the controller, using the controller to recover said address from the reference code, and opening a channel for communication between said first and second stations.]

[31. A method according to claim 30, wherein the method comprises making the communication request automatically by the first station contacting the controller unit.]

[32. A method according to claim 30, wherein there is a first party at the first station, and the method comprises making the communication request by the first party contacting the controller.]

[33. An apparatus for facilitating anonymous communication between a first party and a second party employing first and second stations respectively, each station being enabled to transmit and receive packet data and being connected directly to a packet data network, the second party having an address for communication, including a means for enabling negotiation of a transaction specification over the packet data network, a means for generating a reference code, there being a defined relationship between the reference code and said address, and for supplying the reference code to at least the first party, a means for receiving a communication request from at least the first party and for receiving the reference code from at least the first party, a means for using the reference code to recover said address, and a means for opening a communication channel between said first party and said address without supplying said address to the first party.]

[34. An apparatus according to 33, wherein the means for opening a communication channel includes a means to test whether a connection is established.]

[35. An apparatus according to 33, further comprising means to verify the communication request against at least one criterion specified in the transaction specification before opening a communication channel between the first party and said address.]

[36. A method according to claim 1, wherein the anonymous communication is voice communication being one of telephone, cellular and voice-over Internet protocol communication.]

[37. A method according to claim 1, wherein the anonymous communication is data communication being one of email, chat, messaging and web publishing.]

*38. A method of facilitating voice communication between a first station and a second station over a packet data network and each station being enabled to transmit and receive packet data and being connected directly to a packet data network, the first and second stations being operated by a first party and a second party, respectively, the method comprising:*

*receiving at least part of a connection instruction by a controller from the first station, the connection instruction identifying the second station or the second party,*

*supplying a reference code by the controller to the first station, there being a defined relationship between the reference code and the second station or the second party,*

*receiving a communication request by the controller from the first station for voice communication between the first and second stations, the communication request employing at least in part the reference code, the reference code having been previously supplied by the controller to the first station,*

*opening a channel for voice communication by the controller between the first and second stations, the channel for voice communication including the packet data*

*network that is connected directly to at least one of the first and second stations,*

*monitoring the duration of time that the channel for voice communication is open by the controller, and*

*when the channel for voice communication is closed, storing in memory by the controller the duration of the time that the channel for voice communication was open.*

*39. A method according to claim 38, further comprising sending by the controller at least an indication related to the identity of the first station or the party at the first station by the controller to the second station.*

*40. A method according to claim 38, further comprising charging by the controller the first user a fee based on the duration or by a fixed sum.*

*41. A method according to claim 40, in which charging a fee includes charging a fee that one user will pay the other user.*

*42. A method according to claim 40, in which charging a fee includes charging a fee that one user pays to a service for opening the channel for voice communication.*

*43. A method according to claim 38, further comprising identifying by the controller the start time that the channel for voice communication is opened.*

*44. A method according to claim 38, in which the communication channel includes wireless communication channel.*

*45. An apparatus facilitating voice communication between a first station and a second station over a packet data network and each station being enabled to transmit and receive packet data and being connected directly to a packet data network, the packet data network including a wireless network, the first and second stations being operated by a first party and a second party, respectively, the apparatus comprising:*

*one or more network interfaces for receiving a communication request from the first station for voice communication between the first and second stations,*

*one or more memory, and*

*one or more processors coupled to the network interface for receiving at least part of a connection instruction from the first station, the connection instruction identifying the second station or the second party, supplying a reference code to the first station, there being a defined relationship between the reference code and the second station or the second party, receiving a communication request from the first station for voice communication between the first and second stations, the communication request employing at least in part the reference code, the reference code having been previously supplied to the first station, opening a channel for voice communication between the first and second stations, the channel for voice communication including the packet data network that is connected directly to at least one of the first and second stations, identifying the starting time that the channel for voice communication is opened, and storing in the memory the starting time that the channel for voice communication was opened.*

*46. An apparatus according to claim 45, in which the processor monitors the duration of time that the channel for voice communication is open, and when the channel for voice communication is closed, stores in the memory the duration that the channel for voice communication was open.*

*47. An apparatus according to claim 45, in which the processor is further configured to charge the first party a fee based on the duration or a fixed fee.*

*48. An apparatus according to claim 45, in which the apparatus is a node in the Internet.*

*49. An apparatus according to claim 45, in which the apparatus includes one or more servers and/or controllers.*

*50. A method of facilitating voice communication between a first station and a second station over a packet data network and each station being enabled to transmit and receive packet data and being connected directly to a packet data network, the first and second stations being operated by a first party and a second party, respectively, the method comprising:*

*receiving at least part of a connection instruction by a controller from the first station, the connection instruction identifying the second station or the second party,*

*supplying a reference code by the controller to the first station, there being a defined relationship between the reference code and the second station or the second party,*

*receiving a communication request by the controller from the first station for voice communication between the first and second stations, the communication request employing at least in part the reference code, the reference code having been previously supplied by the controller to the first station,*

*opening a channel for voice communication by the controller between the first and second stations, the channel for voice communication including the packet data network that is connected directly to at least one of the first and second stations,*

*monitoring by the controller the duration of time that the channel for voice communication is open, and*

*when the channel for voice communication is closed, charging one of the first party and second party by the controller a fee based on a fixed sum or by the duration of the time that the channel for voice communication was open.*

*51. A method according to claim 50, in which charging a fee includes charging a fee that one user will pay the other user.*

*52. A method according to claim 50, in which charging a fee includes charging a fee that one user pays to a service provider providing a controller for opening the channel of voice communication.*

*53. A method according to claim 50, in which the communication channel includes one or more of a wired and a wireless communication channel, individually or in any combination.*

*54. A method according to claim 50, further comprising detecting by the controller automatically a time or time frame availability of the second party at the second station prior to opening the communication channel.*

*55. A method according to claim 50, further comprising sending by the controller information related to a time or a time frame availability of the second party to the first station.*

*56. An apparatus facilitating voice communication between a first station and a second station over a packet data network and each station being enabled to transmit and receive packet data and being connected directly to a packet data network, the first and second stations being operated by a first party and a second party, respectively, the apparatus comprising:*

*at least one memory, and*

*at least one processor coupled to the network interface for receiving at least part of a connection instruction from the first station, the connection instruction identifying the second station or the second party, supplying a ref-*

*erence code to the first station, there being a defined relationship between the reference code and the second station or the second party, receiving a communication request from the first station for voice communication between the first and second stations, the communication request employing at least in part the reference code, the reference code having been previously supplied to the first station, opening a channel for voice communication between the first and second stations, the channel for voice communication including =the packet data network that is connected directly to at least one of the first and second stations, monitoring the duration of time that the channel for voice communication is open, when the channel for voice communication is closed, storing in the memory the duration of time that the channel for voice communication was open and charging one of the first party and the second party a fee based on a fixed sum or the duration of the time that the channel for voice communication was open.*

*57. An apparatus according to claim 56, in which charging a fee includes charging a fee that one user will pay the other user.*

*58. An apparatus according to claim 56, in which charging a fee includes charging a fee that one user pays to a service provider providing the apparatus.*

*59. An apparatus according to claim 56, in which the apparatus includes one or more servers.*

*60. An apparatus according to claim 56, in which the apparatus includes one or more nodes on the Internet.*

* * * * *